(12) United States Patent
Deggendorf

(10) Patent No.: US 8,010,435 B1
(45) Date of Patent: Aug. 30, 2011

(54) METHOD AND SYSTEM FOR MORTGAGE PAYMENT ANALYSIS AND REPORTING

(75) Inventor: Steven E. Deggendorf, Washington, DC (US)

(73) Assignee: Fannie Mae, Washington, DC (US)

( * ) Notice: Subject to any disclaimer, the term of this patent is extended or adjusted under 35 U.S.C. 154(b) by 397 days.

(21) Appl. No.: 12/194,366

(22) Filed: Aug. 19, 2008

Related U.S. Application Data

(60) Provisional application No. 60/965,369, filed on Aug. 20, 2007.

(51) Int. Cl.
*G06Q 40/00* (2006.01)
(52) U.S. Cl. .......................................... 705/36 T; 705/30
(58) Field of Classification Search ............... 705/10–44
See application file for complete search history.

(56) References Cited

U.S. PATENT DOCUMENTS

| | | | | |
|---|---|---|---|---|
| 4,742,457 A | * | 5/1988 | Leon et al. | 705/35 |
| 5,742,775 A | * | 4/1998 | King | 705/38 |
| 6,202,052 B1 | * | 3/2001 | Miller | 705/31 |
| 7,236,985 B2 | * | 6/2007 | Brecher | 1/1 |
| 7,610,226 B1 | * | 10/2009 | Miller | 705/31 |
| 7,818,222 B2 | * | 10/2010 | Allanson et al. | 705/31 |
| 7,925,589 B2 | * | 4/2011 | Rogers | 705/56 |

OTHER PUBLICATIONS

"Interest Calculator", www.calculator.net/interst-calculator.html year 2010.*

* cited by examiner

*Primary Examiner* — Frantzy Poinvil
(74) *Attorney, Agent, or Firm* — Foley & Lardner LLP

(57) ABSTRACT

A computer implemented system for determining an amount of mortgage interest tax impact available to a borrower includes a mortgage information interface configured to receive information related to a mortgage loan, the mortgage loan including an inflationary index provision, a total tax impact calculator configured to determine a total mortgage interest tax impact available based on an amount of mortgage interest paid and an amount of an adjustment to an outstanding principal balance based on the inflationary index provision, and a reporting engine configured to provide the total mortgage interest tax impact available.

19 Claims, 8 Drawing Sheets

METHOD AND SYSTEM FOR MORTGAGE PAYMENT ANALYSIS AND REPORTING

CROSS-REFERENCE TO RELATED PATENT APPLICATIONS

This application claims priority from U.S. Provisional Application No. 60/965,369, filed Aug. 20, 2007, which is hereby incorporated by reference herein in its entirety.

BACKGROUND

The present disclosure relates generally to a system and method for calculating tax impacts associated with mortgage products and, in particular, to such a system and method that provides mortgage consumers with an online tool to determine available tax impacts associated with an inflation indexed mortgage product.

Typical online tools, also known as mortgage calculators, allow a mortgage consumer to determine the monthly payments a mortgage consumer will need to make for the purchase of a house or refinancing of an existing loan. These online calculators determine the monthly payment based on various factors including the purchase price of the property, the mortgage consumer's intended down payment, the interest rate applicable to the purchase and the term or type of mortgage being considered (e.g., ARM, 30 year fixed).

The mortgage tools also typically show the amount of interest associated with each payment being made by the borrower. This amount is typically also reflective of the mortgage interest tax impact to which the borrower is entitled. However, this may not always be the case, especially where the user has a mortgage loan in which the tax impact may be other than the fixed rate mortgage interest that is paid.

SUMMARY

One embodiment relates to a computer implemented system for determining an amount of mortgage interest tax impact available to a borrower. The system includes a mortgage information interface configured to receive information related to a mortgage loan, the mortgage loan including an inflationary index provision, a total tax impact calculator configured to determine a total mortgage interest tax impact available based on an amount of mortgage interest paid and an amount of an adjustment to an outstanding principal balance based on the inflationary index provision, and a reporting engine configured to provide the total mortgage interest tax impact available.

Another embodiment relates to a computer implemented method for determining a mortgage interest tax impact available to a borrower. The method includes storing information related to a mortgage loan in a computer-related database, the mortgage loan including an inflationary index provision, determining a total mortgage interest tax impact available based on an amount of mortgage interest paid and an amount of an adjustment to an outstanding principal balance based on the inflationary index provision, and providing the total mortgage interest tax impact available.

Another embodiment relates to a computer implemented system for generating a payment structure for repayment of a loan. The system includes a borrower information interface configured to receive one or more borrower financial objectives, the objectives including at least one of optimizing tax benefits, reducing negative amortization, minimizing future payment growth, and matching payment growth to borrower personal income growth, and a loan payment structure generation system configured to generate a payment structure for a mortgage loan including an inflationary index provision based on the one or more borrower financial objectives.

It would be desirable to provide an online tool in the form of a mortgage interest tax impact calculator. It would be particularly desirable to provide such a calculator configured to calculate the mortgage interest tax impact associated with an mortgage loan having additional mortgage interest tax impacts.

DETAILED DESCRIPTION OF EXEMPLARY EMBODIMENTS

Figure 1:
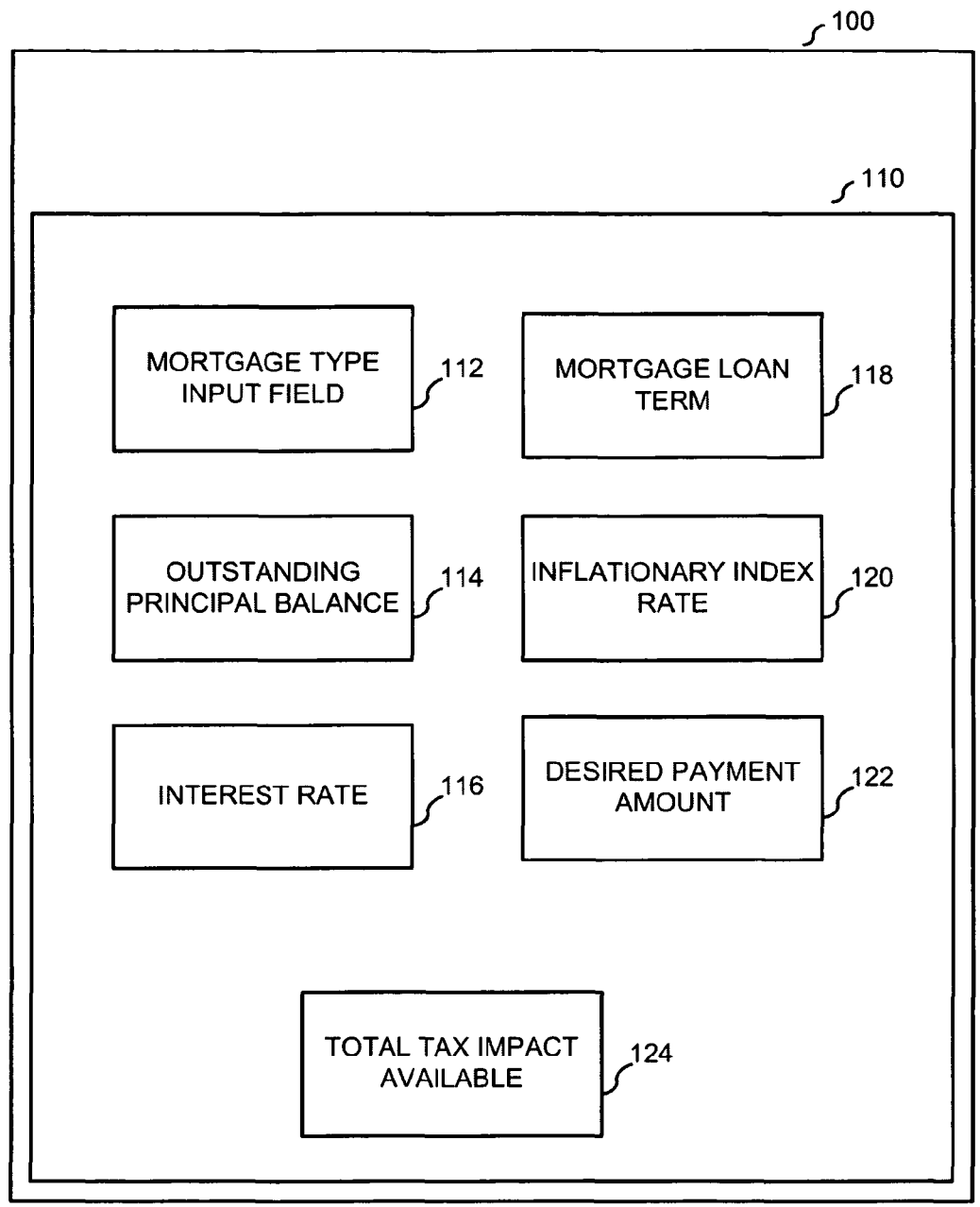
FIG. 1 is a web-based implementation of a mortgage interest tax impact calculator 110 according to an exemplary embodiment.

Referring to FIG. 1, a web-based implementation 100 of a mortgage interest tax impact calculator 110 is shown according to an exemplary embodiment. Calculator 110 may include a mortgage type field 112, an outstanding principal balance field 114, an interest rate field 116, a remaining mortgage term field 118, an inflation index value or rate field 120, a desired payment amount field 122, and an available tax impact output field 124. Calculator 110 may be configured to generate and display to a user a mortgage interest tax impact amount in output field 124 that accrues to a user based on the inputs provided in fields 112-122.

Mortgage interest tax impact calculator 110 may be configured to be offered by a mortgage company, a mortgage servicing company, a secondary mortgage market participant, etc. Alternatively, calculator 110 may be configured for internal use by a secondary mortgage market participant or by a servicing company. For example, calculator 110 may be used by a mortgage servicing company in preparing a monthly mortgage statement or an end of year tax statement. Calculator 110 may be displayed on a web page accessible to the public such that any user can calculate their potential tax impacts by providing information in fields 112-122.

Input fields 112-122 may be implemented as any of a variety of input field types. Exemplary types may include numeric or text fields, drop down selection fields, file selection fields, or any other type of input component that allows a user to provide the requested information.

Although calculator 110 is shown as a web-based implementation, it should be understood by one of ordinary skill in the art that calculator 110 may be implemented in a variety of ways to provide the functionality described herein. For example, calculator 110 may be implemented as a Java-based calculator, an XML: based calculator, etc.

Although calculator 110 is shown as including specific input and output fields, it should be understood that calculator 110 may alternatively be implemented using a variety of input and output fields. Alternative input fields may include a mortgage identification number field such that information that would normal be provided to input fields 112-122 is automatically populated with user information such as user tax information, etc.

Mortgage type input field 112 may be configured to receive a mortgage type. Exemplary mortgage types may include any available mortgage type including, but not limited to 30 year, 15 year, 7 year, or 1 year mortgages, fixed, variable, or hybrid interest rate mortgages, negatively amortizing mortgages, etc. According to one embodiment, calculator 110 may be specifically configured to function based on a price level adjusted mortgage (PLAM) in which the rate of interest paid remains fixed, but the outstanding balance is adjusted for inflation according to an appropriate price index.

Figure 2:
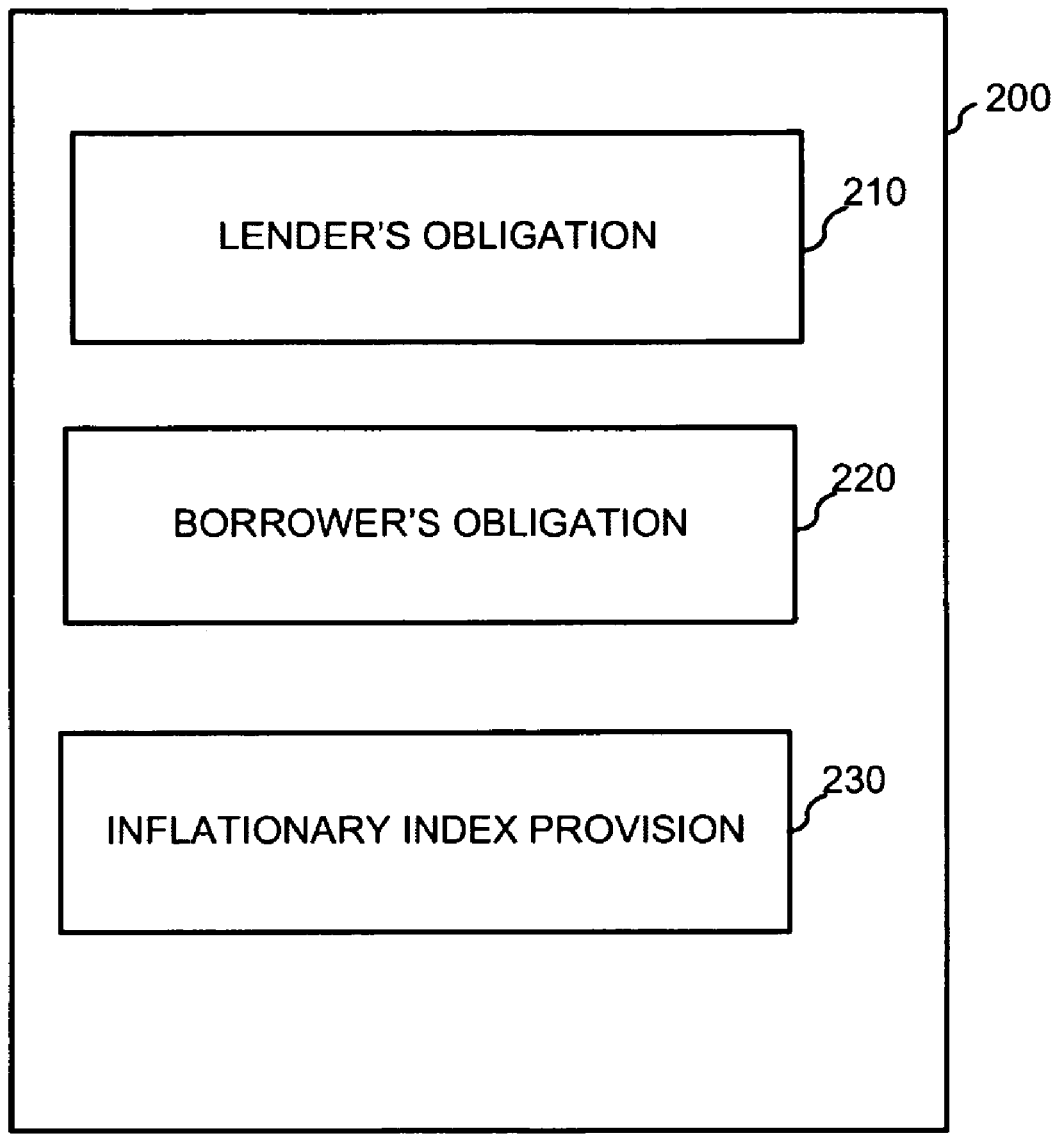
FIG. 2 is a price level adjusted mortgage loan agreement in which the rate of interest paid remains fixed, but the outstanding balance is adjusted for inflation according to an appropriate price index according to an exemplary embodiment.

Referring now to FIG. 2, a price level adjusted mortgage loan agreement 200 in which the rate of interest paid remains fixed, but the outstanding balance is adjusted for inflation according to an appropriate price index is shown according to an exemplary embodiment. Although loan agreement 200 is shown as a mortgage type for use with calculator 110, it should be understood that calculator 110 may be used with any type of mortgage and may be particularly useful in calculating the available mortgage interest tax impact where the tax impact is other than a standard fixed interest rate coupon amount.

FIG. 2 illustrates price level adjusted mortgage loan agreement 200 according to one embodiment. Loan agreement 200 may comprise an obligation for a lender to provide loan funds 210, an obligation for a borrower to repay loan funds 220, and an inflation indexing provision 230. Other and/or different clauses, features, or impacts may also be included. According to an exemplary embodiment, loan agreement 200 may be a mortgage agreement in which the equity in the borrower's home is used to provide security to the lender, further described below.

Lender's obligation 210 may commit the lender to provide loan funds. The lender may be, for example, a bank, credit union, or other financial institution. The loan funds may be transferred to a person obtaining the loans funds, usually the owner of a home. Alternatively, the loan funds may be transferred to a third party at the direction of the owner of the home. The loan funds may be provided as a lump sum, as an amount against which withdrawals may be made, as a series of payments, etc. The series of payments may be payments that are substantially equal, variable, or tied to a particular external payment obligation of the borrower, such as the premium for a life insurance policy or property taxes set by a government agency. The loan funds may typically be less than the value of the home. According to an exemplary embodiment, the loans funds may be required to be less than an assessed value of the home minus any outstanding obligations, such as first mortgages, that are secured by the home. Herein, the terms "home" and "housing" are used broadly to refer to single and multi-family housing, condominiums, and other locations where people may live, and proportional interests therein. Terms of the lender's obligation (e.g., amount of loan funds, date loan funds are to be made available, and so on) may preferably be set forth in the one or more mortgage or loan documents which are executed by the borrower.

Borrower's obligation 220 may be an obligation to repay the loan funds and any interest that accrues on the loan funds. The original balance of money lent can be referred to as the principal. The remaining principal balance on a loan, which does not include interest, can be referred to as the unpaid principal balance. As described in greater detail below, a co-borrower or joint borrower may also be subject to the borrower's obligation to repay the loan funds 220. The borrower's obligation to repay the loan funds 220 may be enforceable by the lender by way of a lien (or legal claim) against the home which, if the borrower's obligation to repay the loan funds 220 is not met, may permit the lender to sell the property and use the proceeds to pay off the loan balance (foreclosure). The lender or other beneficiary of the borrower's obligation to repay the loan funds is commonly referred to as the "note holder." Terms of the borrower's obligation to repay the loan funds (e.g., interest terms, monthly payment amounts) along with other obligations pertinent to the borrower (e.g., obligations to pay taxes, maintain the property obligations, maintain hazard insurance on the property, and so on) may preferably be set forth in the one or more mortgage documents which are executed by the borrower.

Inflation indexing provision 230 may be a provision of loan agreement 200 describing the manner in which that outstanding principal balance may be adjusted based on a defined inflationary index. Inflation indexing provision 230 may be included and implemented in loan agreement 200 according to an exemplary embodiment. The terms of inflation indexing provision 230 may be set forth in specific language within loan agreement 200.

Inflation indexing provision 230 may be configured such that loan agreement 200 defines a low fixed interest rate and that the outstanding principal balance is indexed to the Consumer Price Index for all Urban Consumers (CPI-U) inflation measure published monthly by the Bureau of Labor Statistics (BLS). Under inflation indexing provision 230, payments made by the borrower may increase only with inflation and therefore remain constant in real terms over the life of the loan, and the payment burden on the user may be lower in the early years of the mortgage terms compared to equivalent fixed and variable loan agreements.

According to an exemplary embodiment, inflation indexing provision 230 may define a variety of different terms defining the detailed implementation of the inflationary indexing. For example, inflation indexing provision 230 may define the frequency at which the outstanding principal balance is adjusted (e.g., yearly, quarterly, monthly, etc.), may define the particular inflationary index to be used, may include a provision that prevents reduction of the outstanding principal balance due to deflation, etc.

Following adjustment of the outstanding principal balance based on the inflationary index, the payment amount may be adjusted to ensure that the outstanding principal balance is fully amortized over the remaining loan term. The amount of the adjustments to the outstanding principal balance and, accordingly, to the payment amount, may be constrained by a floor and/or a cap. Loan agreement 200 may further define both periodic and/or lifetime caps and floors. For example, the principal balance due at any time may be constrained by a lifetime cap to not exceed 115% of the original principal balance. This feature may be implemented to protect borrowers from periods of severe inflation.

Figures 3A, 3B:
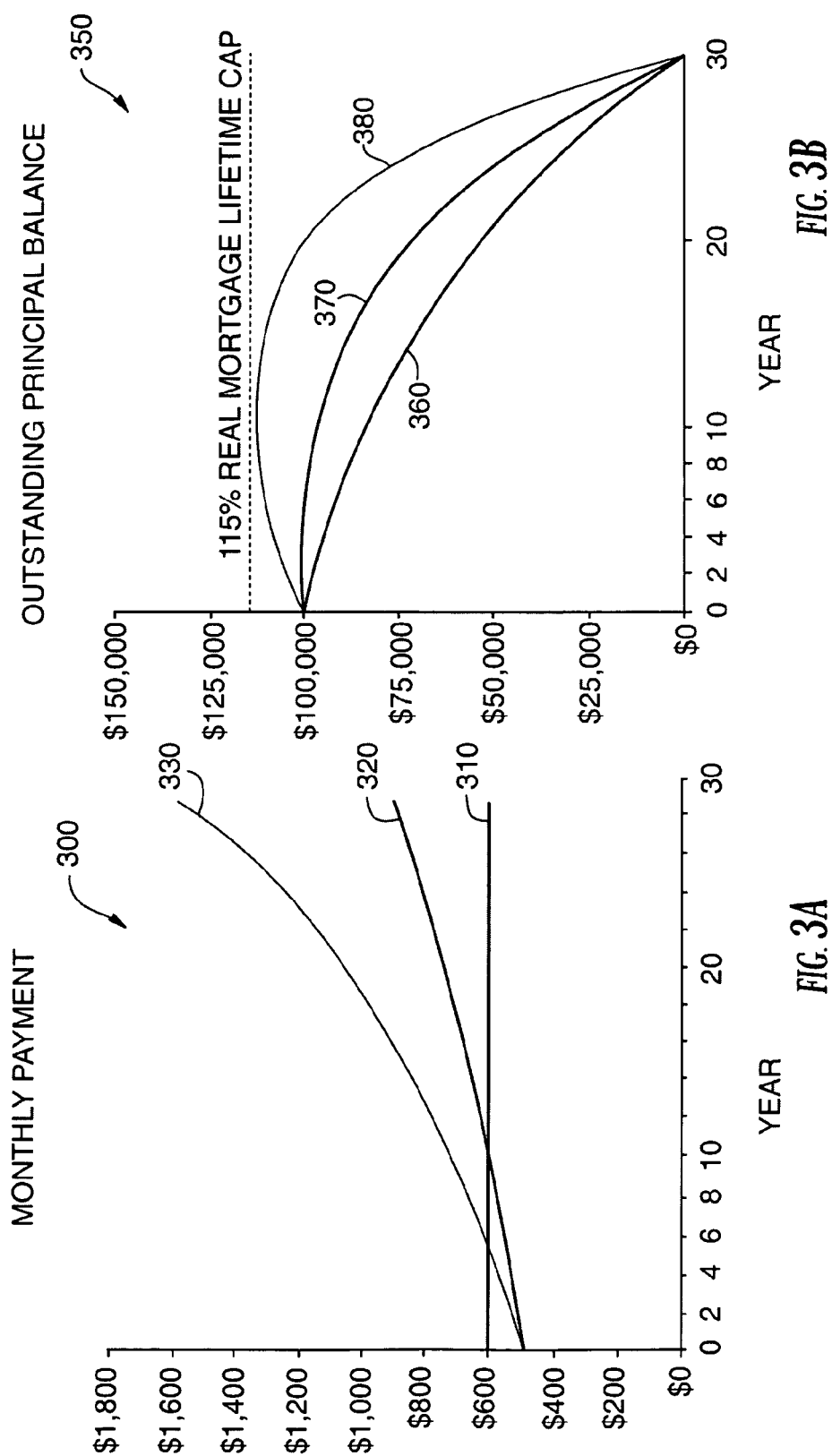
FIG. 3A is a graphical illustration illustrating potential amounts of monthly payments to be paid under the loan agreement, including the inflation indexing provision at a variety of interest rates according to an exemplary embodiment.
FIG. 3B is a graphical illustration illustrating potential amounts of the outstanding principal balance to be repaid by the borrower under the loan agreement, including the inflation indexing provision, at a variety of interest rates according to one exemplary embodiment.

Referring now to FIG. 3A, a graphical illustration 300 showing the potential amounts of monthly payments to be paid under loan agreement 200 including inflation indexing provision 230 at a variety of interest rates is shown according to one exemplary embodiment. Illustration 300 shows a fixed monthly payment amount 310, an inflationary indexed at 2% CPI-U monthly payment amount 320, and an inflationary indexed at 4% CPI-U monthly payment amount 330, over a 30 year mortgage loan term. As seen, the amount of the monthly payments that are made under loan agreement 200, and the amount of variable interested paid, may vary widely over a loan term based on the amount of inflation experienced during the term.

Referring now to FIG. 3B, a graphical illustration 350 illustrating potential amounts of the outstanding principal balance to be repaid by the borrower under loan agreement 200, including inflation indexing provision 230, at a variety of interest rates is shown according to one exemplary embodiment. Illustration 350 shows a fixed rate loan amortization 360, an inflationary indexed at 2% CPI-U loan amortization 370, and an inflationary indexed at 4% CPI-U loan amortization 380, over a 30-year mortgage loan term. As seen, when the inflation rate is high, a loan may experience a period of negative amortization. It is during this period that the borrower may be paying less than the fixed interest rate plus the amount of the outstanding principal balance adjustment.

Although FIGS. 3A and 3B reflect a steady inflation rate, it should be understood the that the inflationary index may vary widely and periods of increasing payments and increasing and/or decreasing outstanding principal balance may also vary widely, increasing a need for calculator 110 to determine the potential tax impact available.

According to an exemplary embodiment, loan agreement 200 may provide a tax impact beyond the amount paid monthly based on interest accrued during each month based on the defined interest rate. According to an exemplary embodiment, loan agreement 200 having inflationary index provision 230 may be treated as being economically equivalent to a variable interest rate mortgage in which the variable interest may be defined as the sum of the fixed interest rate interest amount and the principal due to the inflation index. Accordingly, payments under the loan agreement may be treated first as payment of the accrued interest including the inflationary amount and then as payments of principal. The net effect of this treatment may be that borrowers may be able to deduct the full amount of the payments in the early years as fixed or variable interest payments. Deduction of the full amount may occur any time when the amount of the inflationary adjustment in combination with the amount paid under the fixed interest rate is greater than the amount paid by the borrower.

Referring again to FIG. 1, outstanding principal balance field 114 may be configured to receive the amount currently scheduled to be repaid by the borrower to the lender. The amount may include the original loan amount less any principal paid by the borrower plus any balance adjustments. Interest rate field 116 and loan term field 118 may be the interest rate and loan term associated with the borrower's loan. These fields may be used to calculate the remaining time over which the outstanding principal balance needs to be amortized and the rate at which interest is calculated.

Inflation rate field 120 may be the inflationary index rate described in the inflationary index provision. This field may be automatically populated based upon the prevailing rate published by the BLS. Even with a default value, inflation rate field 120 may be modified by the user if, for example, the user wished to check the effect that various inflation rates will have on the benefits to which they are entitled.

Desired payment amount 122 may be entered by a user, if for example, the user is contemplating modifying their monthly payment and wishes to see the effect on the benefits to which they are entitled. Desired payment amount field 122 may further be provided with a function to allow a user to change their monthly payment amount to the value entered in this field where, for example, calculator 110 may be being displayed on a secure website on a lender or loan servicer.

Available tax impact output field 124 may be a calculated value indicating the amount of tax impact to which the user is entitled. The field may be displayed to a user, used to populate a mortgage statement, offered to a user changing their monthly payment amount, etc. as described in further detail below with reference to FIGS. 4-6.

Figure 4:
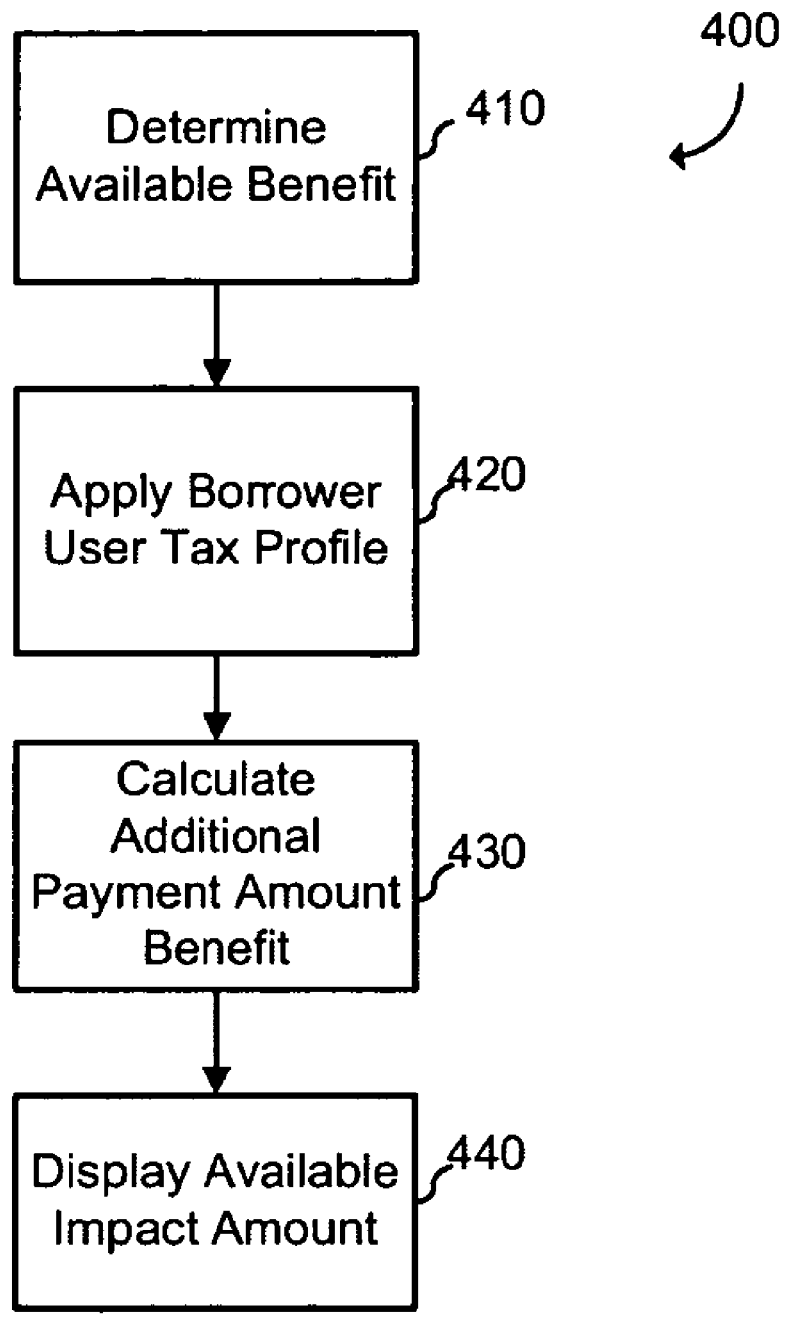
FIG. 4 is a flowchart illustrating a method for determining and providing an amount of tax impact available according to an exemplary embodiment

Referring now to FIG. 4, a flowchart 400 illustrating a method for determining and providing an amount of tax impact available is shown according to an exemplary embodiment. Although a particular number of steps are shown in a particular order, it should be understood that the system and method may include more, fewer, and/or a different configuration of steps to perform the functions described herein.

In a step 410, a total impact amount or available benefit may be determined. How the particular calculation is performed will vary dependent on the type of loan at issue. For example, for conventional loans, the determined amount is equal to the amount of interest paid by the borrower. Where the underlying loan agreement is an inflation indexed loan agreement, the tax impact amount may be equal to the amount of interest paid by the borrower based on the fixed interest rate plus the amount of the increase of the outstanding principal balance based on application of an inflationary index.

In a step 420, the calculated impact amount may be modified by a user personal tax profile. Different users may be more or less able to take advantage of the amount calculated in step 410. For example, a user may be subject to the alternative minimum tax or the underlying loan agreement may be for a second home, a rental property, etc. and the user may not be able to deduct the full amount calculated in step 410. In collecting the user personal tax profile, calculator 110 may ask a series of questions to gather the required information. Alternatively, calculator 110 may be implemented as a component within tax preparation software where the information is collected. Exemplary data can include property data, user tax filing status, user income, deductions, credit, etc.

In a step 430, the available impact amount or benefit may be calculated. The available impact amount may be equal to the total less the amount already being used by the user. For example, where the user is making payments that pay interest calculated under a fixed rate but do not include an amount equal to the increase in the outstanding principal balance based on the inflationary index, the available impact amount will only be the increase in the outstanding principal balance.

In a step 440, the available impact amount and/or the total impact amount or benefit may be displayed to a user of the calculator 110. The impact information may be provided by a loan service or lender as part of a monthly statement, may be provided on a web page, etc. The impact information may further be provided with one or more associated options. An exemplary option may include providing the user with the means to increase their monthly payment amount to take advantage of the total impact amount to which they are entitled.

Figure 5:
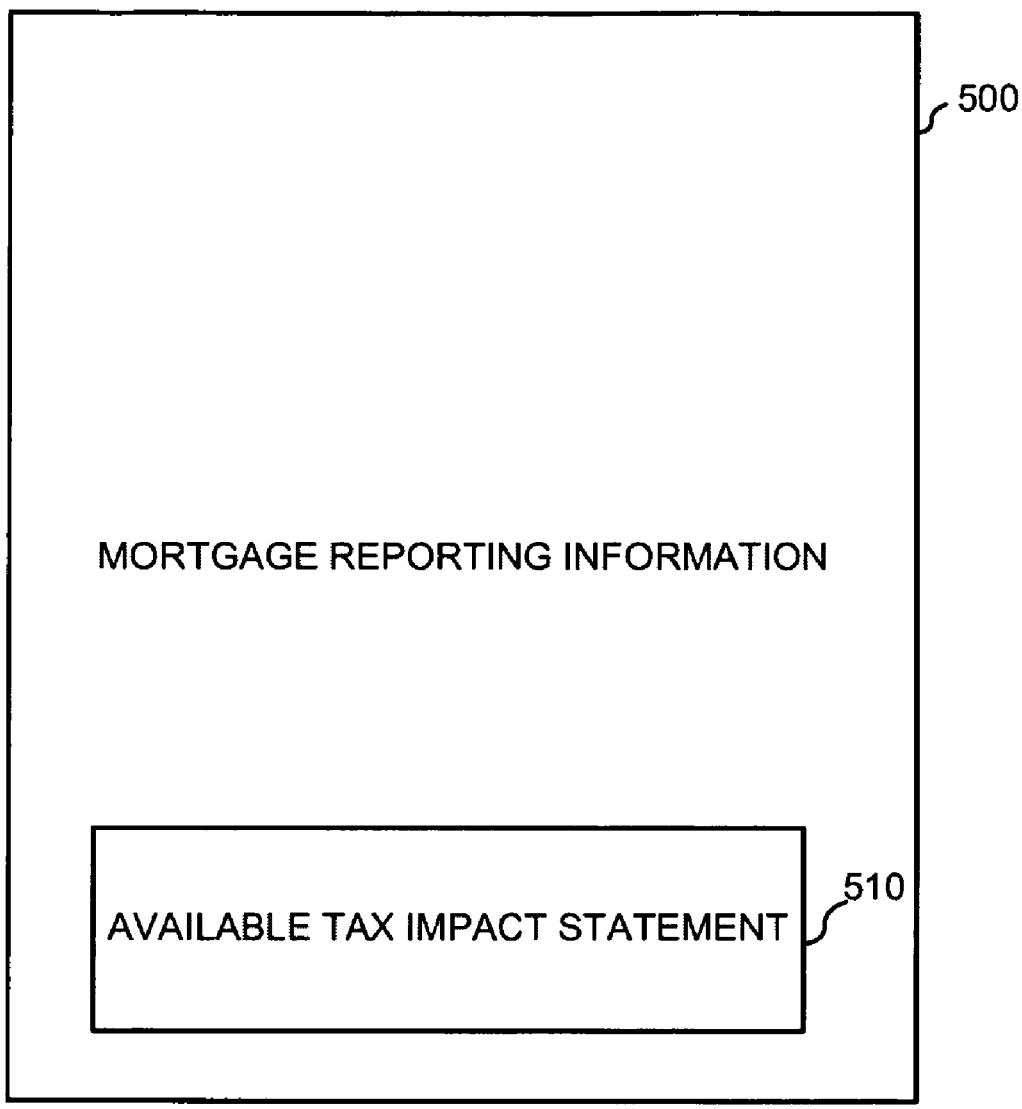
FIG. 5 is a mortgage statement providing an available tax impact amount according to an exemplary embodiment.

Referring now to FIG. 5, a mortgage statement 500 providing an available tax impact amount 510 is shown according to an exemplary embodiment. Mortgage statement 500 may be a standard mortgage statement generated by a mortgage holder or mortgage service providing periodic information related to loan agreement 200 including inflation indexing provision 230. The periodic information may include payments made under the loan agreement, the amount of the loan payment applied to interest, the amount of the loan payment applied the an inflation adjustment to the outstanding principal balance, the amount of the loan payment applied to the outstanding principal balance, etc.

Amount 510 may be an amount of tax impact that the borrower may realize based on the mortgage interest due and the inflationary adjustment to the outstanding principal balance. Amount 510 may be presented as a total realizable amount, a realizable amount that is available if the borrower chooses to pay more than the amortizing payment amount, an amount that is a percentage of the total available balance based on a borrower's personal taxation profile, or any other amount based on the total available mortgage interest tax impact.

Figure 6:
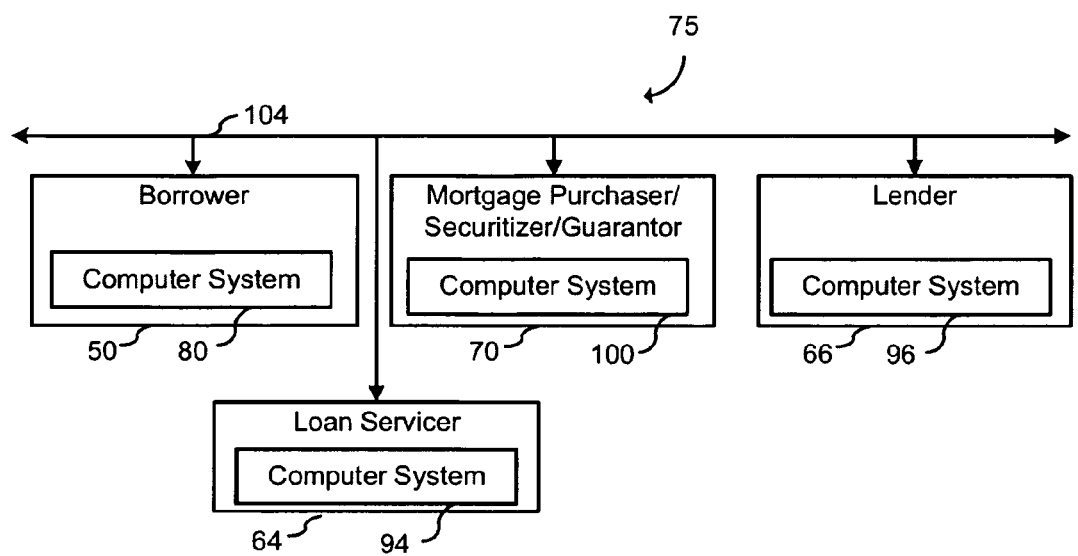
FIG. 6 is a computer system usable to implement various features described herein according to an exemplary embodiment.

Referring now to FIG. 6, a computer system 75 usable to implement various features described herein is shown according to an exemplary embodiment. Computer system 75 may include a variety of computer subsystems, including a computer system 80 associated with a borrower 50, a computer system 94 associated with a loan servicer 64, a computer system 96 associated with a lender 66, and/or a computer system 100 associated with a mortgage purchaser/securitizer/ guarantor 70. Each of computer systems 80-100 may comprise a single computer including a microprocessor and memory with program logic and stored data to implement the features described herein, or may comprise multiple computers which may be connected together, for example, by way of a network (not shown). Computer systems 80-100 may be coupled by way of a network 104, which is shown to be a single network but which may in practice comprise one or more individual point-to-point connections and/or which may comprise one or more network connections, such as the Internet.

Lender computer system 96 and/or loan servicer computer system 94 may be configured to provide the results of a tax impact amount determination. In one configuration, the software executed by lender computer system 96 and/or loan servicer computer system 94 may be a web-based interface (e.g., a web browser) that may communicate via the Internet with mortgage purchaser/securitizer/guarantor computer system 100, and computer system 100 may execute the core algorithms that provide the functionality and logic of the tax impact software. Tax impact software may also be used to analyze the information to determine if the loan meets credit risk and eligibility requirements of mortgage purchaser/securitizer/guarantor 70, and may then issue a recommendation based on the assessment of the overall risk profile of the loan.

Computer system 75 may be used to electronically carry out the transactions described herein, and to conduct other processing/transactions in connection with loan agreement 200, such as those discussed above in connection with FIGS. 4 and 5.

Figure 7:
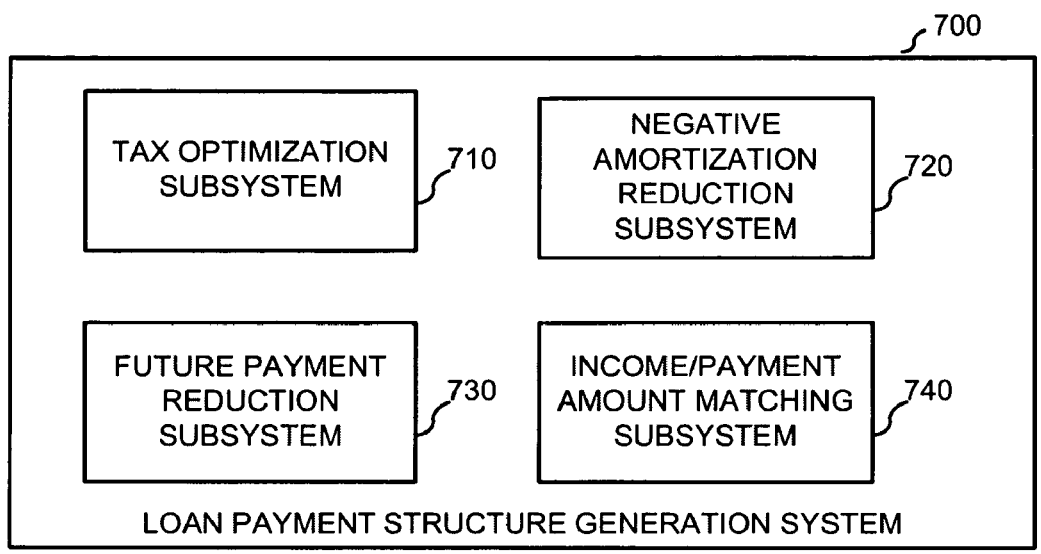
FIG. 7 is a loan payment structure generation system for providing information to assist a borrower in making optimal choices depending on the borrower's financial objectives and financial condition according to an exemplary embodiment.

Referring now to FIG. 7, a loan payment structure generation system 700 for providing information to assist a borrower in making optimal choices depending on the borrower's financial objectives and financial condition is shown according to an exemplary embodiment. System 700 may include a tax optimization subsystem 710, a negative amortization reduction subsystem 720, a future payment reduction subsystem 730, and an income/payment amount matching subsystem 740. It should be understood by one of ordinary skill in the art that system 700 may further include more or fewer subsystems configured to provide the borrower with the flexibility to have their mortgage payments align with their particular financial objectives.

Tax optimization subsystem 710 may be configured to receive borrower information and generate advice and/or implement a payment structure that will optimize borrower tax benefits. Subsystem 710 may be configured to provide relatively straightforward advice such as the immediate tax benefits that are available based on a current payment amount compared to the sum of the accrued mortgage interest, and the adjustment to the outstanding principal balance based on a defined index. Alternatively, subsystem 710 may provide a more detailed analysis, for example, projecting future tax benefits based on current payments amounts, future amounts in varying amounts, one or more predictions regarding the defined index, one or more predictions regarding the borrower personal tax profile, etc.

Negative amortization subsystem 720 may be configured to provide advice and/or generate a payment schedule configured to reduce negative amortization of the outstanding principal balance. Negative amortization may occur when the periodic payment does not cover the amount of interest due and the amount of any adjustment to the outstanding principal balance for that loan period. Negative amortization necessarily involves an increase in the amount of future payments to be made by the borrower. The borrower may wish to reduce or eliminate negative amortization prevent this increase. Accordingly, subsystem 720 may be configured to generate a recommended payment amount or a payment schedule where the amount paid by the borrower is equal to or greater than the amount of interest due and the amount of any adjustment to the outstanding principal balance for that loan period.

Future payment reduction subsystem 730 may be configured to provide advice and/or generate a payment schedule to reduce the growth of future payments. Subsystem 730 may operate similar to subsystem 720 in generating advice or a payment structure based on the amount of interest due and the amount of any adjustment to the outstanding principal balance. Subsystem 730 may be further configured to generate a required future payments schedule to illustrate the effect that different current payment amounts will have on the amount of future payments that will be required to fully amortize the outstanding principal balance over the remaining loan term.

Income/payment amount matching subsystem 740 may be configured to provide advice and/or generate a payment schedule to allow a borrower to match current and/or future income to a current and/or future payment amount. The income amount may be based on a current salary, projected future salary, multiple income streams, anticipated windfalls, etc. Subsystem 740 may be configured to correlate the amount of the payments to a projected future income such that the amount of the loan payments remains a fixed percentage of the total income of the borrower. Accordingly, the borrower may be provided with ease of mind that the payment amount is less likely to balloon as a percentage of income and will always remain as affordable in the future as it is currently.

Although subsystems 710-750 are described as separate subsystems of a single system 700 herein, it should be understood that the systems may alternatively be implemented as separate systems, a single system, etc. Further, the functions described herein as associated with a particular one of the subsystems may alternatively be implemented by any other subsystem or a combination of systems and/or subsystems.

Figure 8:
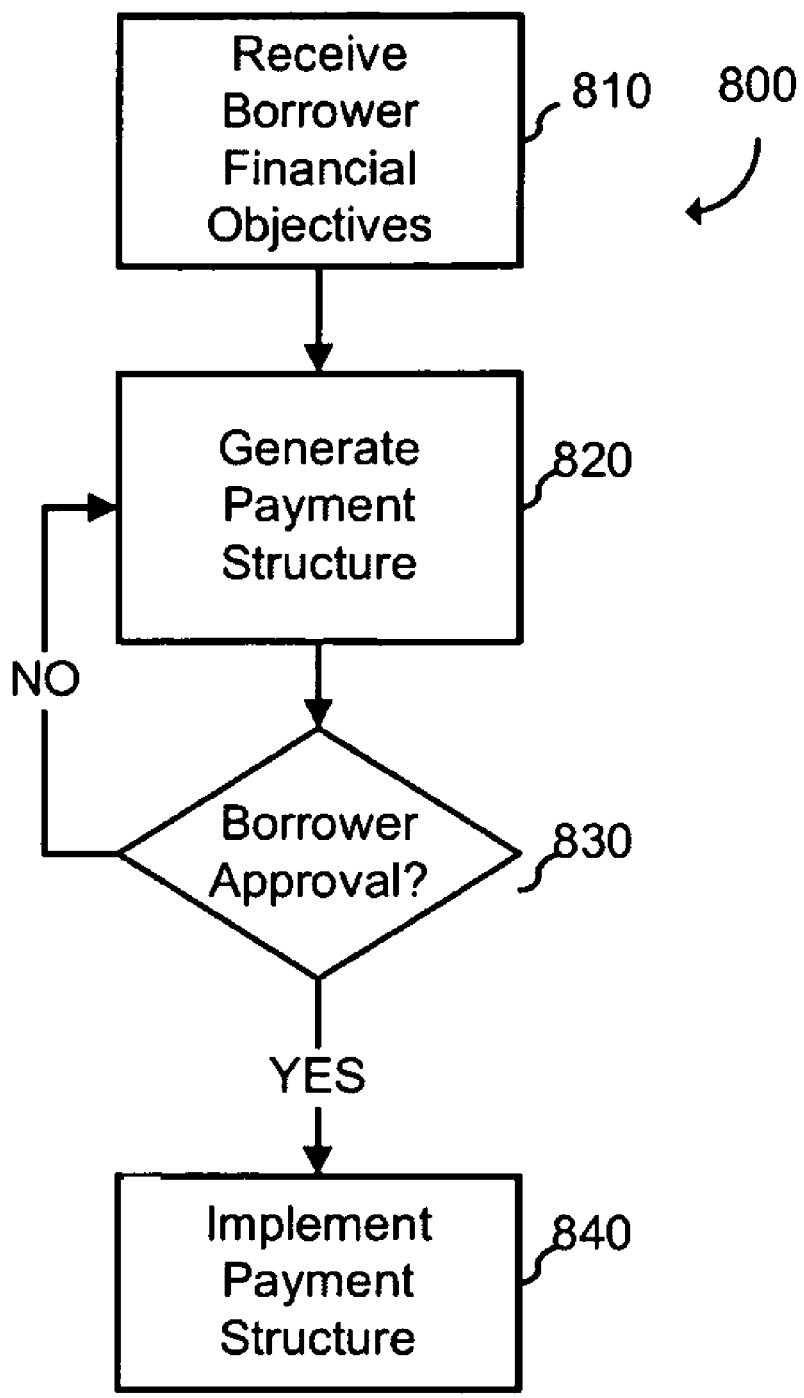
FIG. 8 is a method of providing financial advice to a borrower regarding the amount of loan payments under a loan agreement according to an exemplary embodiment.

Referring now to FIG. 8, a method 800 of providing financial advice to a borrower regarding the amount of loan payments under a loan agreement is shown according to an exemplary embodiment. Method 800 may be implemented, for example, by a loan servicer that is providing advice to a borrower regarding the effect of making payments at various payment amounts in view of the borrower's personal financial objectives.

In a step 810, borrower personal financial objectives are received. The objectives may be received over an internet connection, for example, where the borrower completes an online questionnaire. The financial objectives may include a wide variety of additional information, such as borrower loan information, borrower personal tax profile, borrower income, projected borrower income, etc. The objectives may further be received from more than one source, for example, a borrower credit score may be retrieved from a credit agency to supplement the borrower provided information. The borrower personal financial objectives may further include identification of at least one primary objective, such as optimizing tax benefits, reducing negative amortization, minimizing the growth of future payments, matching payment growth to personal income growth, etc.

In a step 820, system 700 may be configured to generate advice and/or a payment structure based on the information received in step 820. The advice and/or a payment structure may be for current payments, future payments, etc.

In a step 830, the borrower may be asked to approve or disapprove the proposed advice and/or payment structure. If the borrower disapproves the advice and/or payment structure, step 820 may be iteratively performed using revised information and/or assumptions until the borrower is satisfied.

If the borrower is satisfied, the advice and/or payment schedule may be implemented in a step 840. Implementation of the advice may include transferring funds for a current payment, structuring payments for future payment vouchers to be sent to the payment, setting up future automatic payments, etc.

The embodiments discussed herein have been described with reference to drawings. The drawings illustrate certain details of specific embodiments that implement the systems and methods and programs of the present disclosure. However, such use of the drawings should not be construed as imposing any limitations that may be present in the drawings. The present disclosure contemplates methods, systems and program products on any machine-readable media for accomplishing its operations. The embodiments discussed herein may be implemented using an existing computer processor, or by a special purpose computer processor incorporated for this or another purpose or by a hardwired system.

As noted above, embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Various embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, various embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Various embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the present disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from practice of the subject matter disclosed herein. The embodiments were chosen and described in order to explain the principals of the disclosure and its practical application to enable one skilled in the art to utilize the subject matter in various embodiments and with various modifications as are suited to the particular use contemplated. Other substitutions, modifications, changes and omissions may be made in the design, operating conditions and arrangement of the embodiments without departing from the scope of the present disclosure.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While several exemplary embodiments have been provided, it should be understood that these embodiments are offered by way of example only. Other embodiments may include, for example, structures with different data mapping or different data. This disclosure is not limited to a particular embodiment, but extends to various modifications, combinations, and permutations that nevertheless fall within the scope and spirit of the appended claims.

What is claimed is:

1. A computer implemented system for determining an amount of mortgage interest tax impact available to a borrower, comprising:
   a computer having computer-readable instructions stored therein, the computer and computer-readable instructions in combination implementing:
      a mortgage information interface configured to receive information related to a mortgage loan, the mortgage loan including an inflationary index provision;
      a total tax impact calculator configured to determine a total mortgage interest tax impact available based on an amount of mortgage interest paid and an amount of an adjustment to an outstanding principal balance based on the inflationary index provision; and
      a reporting engine configured to provide the total mortgage interest tax impact available.

2. The system of claim 1, wherein the computer and computer-readable instructions in combination further implement:
   an available tax impact calculator configured to adjust the total mortgage interest tax impact based on a user personal tax profile.

3. The system of claim 2, wherein the available tax impact calculator is further configured to adjust the total mortgage interest tax impact based on the monthly amount already being paid by a borrower.

4. The system of claim 1, wherein the adjustment to an outstanding principal balance is a yearly adjustment and the amount of the adjust is a monthly amount determined based on the yearly adjustment.

5. The system of claim 1, wherein the computer and computer-readable instructions in combination further implement:
   a future impact projection calculator configured to determine a future total mortgage interest tax impact based on a hypothetical future monthly payment amount.

6. The system of claim 5, wherein the total tax impact calculator is configured to determine a plurality of forecasted available total mortgage interest tax impacts based on a variety of potential inflationary index values.

7. The system of claim 1, wherein the reporting engine is configured to provide the total mortgage interest tax impact available in a monthly statement reporting mortgage loan activity.

8. A computer implemented method for determining a mortgage interest tax impact available to a borrower, comprising:
   storing information related to a mortgage loan in a computer-implemented database, the mortgage loan including an inflationary index provision;
   determining, by a computer, a total mortgage interest tax impact available based on an amount of mortgage interest paid and an amount of an adjustment to an outstanding principal balance based on the inflationary index provision; and
   providing, by the computer, the total mortgage interest tax impact available.

9. The method of claim 8, further comprising:
   adjusting the total mortgage interest tax impact based on a user personal tax profile.

10. The method of claim 9, further comprising:
    adjusting the total mortgage interest tax impact based on the monthly amount already being paid by a borrower to determine an available mortgage interest tax impact.

11. The method of claim 8, wherein the adjustment to an outstanding principal balance is a yearly adjustment and the amount of the adjustment is a monthly amount determined based on the yearly adjustment.

12. The method of claim 8, further comprising:
    determining a future total mortgage interest tax impact based on a hypothetical future monthly payment amount.

13. The method of claim 8, wherein the total mortgage interest tax impact available is provided in a monthly statement reporting mortgage loan activity.

14. The method of claim 8, further comprising:
    determining a plurality of forecasted available total mortgage interest tax impacts based on a variety of potential future inflationary index values.

15. A computer implemented system for generating a payment structure for repayment of a loan, comprising:
    a computer having computer-readable instructions stored therein, the computer and computer-readable instructions in combination implementing:
       a borrower information interface configured to receive one or more borrower financial objectives, the objectives including at least one of optimizing tax benefits, reducing negative amortization, minimizing future payment growth, and matching payment growth to borrower personal income growth; and a loan payment structure generation system configured to generate a payment structure for a mortgage loan including an inflationary index provision based on the one or more borrower financial objectives.

16. The system of claim 15, wherein the computer and computer-readable instructions in combination further implement:

a payment system configured to implement the generated payment structure.

17. The system of claim 15, wherein the payment structure is generated further based on an amount of mortgage interest and an amount of an adjustment to an outstanding principal balance based on the inflationary index provision.

18. The system of claim 17, wherein the adjustment to an outstanding principal balance is a yearly adjustment and the amount of the adjustment is a monthly amount determined based on the yearly adjustment.

19. The system of claim 15, wherein the loan payment structure generation system is configured to generate a plurality of payment structures based on a variety of potential future inflationary index values.

* * * * *